US011813938B2

(12) United States Patent
Epple et al.

(10) Patent No.: US 11,813,938 B2
(45) Date of Patent: Nov. 14, 2023

(54) AUXILIARY POWER TAKE-OFF ASSEMBLY

(71) Applicant: ZF Friedrichshafen AG, Friedrichshafen (DE)

(72) Inventors: Michael Epple, Bad Waldsee (DE); Michael Trübenbach, Friedrichshafen (DE); Hermann Lanz, Frickingen (DE); Sylva Rother, Kressbronn am Bodensee (DE); Mario Holder, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 531 days.

(21) Appl. No.: 17/042,491

(22) PCT Filed: Feb. 27, 2019

(86) PCT No.: PCT/EP2019/054777
§ 371 (c)(1),
(2) Date: Sep. 28, 2020

(87) PCT Pub. No.: WO2019/185261
PCT Pub. Date: Oct. 3, 2019

(65) Prior Publication Data
US 2021/0023943 A1 Jan. 28, 2021

(30) Foreign Application Priority Data
Mar. 29, 2018 (DE) .................. 10 2018 204 910.6

(51) Int. Cl.
*B60K 17/28* (2006.01)
*B60K 25/06* (2006.01)
(Continued)

(52) U.S. Cl.
CPC .............. *B60K 17/28* (2013.01); *B60K 25/06* (2013.01); *F16C 19/361* (2013.01); *F16H 57/02* (2013.01);
(Continued)

(58) Field of Classification Search
CPC .................... B60K 17/28; B60K 25/06; F16H 2057/02026; F16H 2057/02043; F16H 2057/02047; F16H 57/02; F16C 19/361
See application file for complete search history.

(56) References Cited

U.S. PATENT DOCUMENTS 2,817,408 A * 12/1957 Klemm .................. B60K 17/28
74/15.69
3,406,579 A 10/1968 Fisher et al.
(Continued)

FOREIGN PATENT DOCUMENTS

DE 1 037 277 8/1958
DE 26 56 669 B1 3/1978
(Continued)

OTHER PUBLICATIONS

German Search Report Corresponding to 10 2018 204 912.2 dated Feb. 1, 2019.
(Continued)

*Primary Examiner* — Laura Freedman
(74) *Attorney, Agent, or Firm* — Finch & Maloney PLLC

(57) ABSTRACT

An auxiliary power take-off assembly in a motor vehicle transmission, which has a torque converter, a transmission input and a transmission output. The auxiliary power take-off assembly includes: an input shaft at the transmission input, and which is permanently connected to a drive motor of the motor vehicle by way of the pump shaft of the torque converter; a transmission output shaft at the transmission output; a transmission chain, which includes an input ele-
(Continued)

ment and an output element and the output element of which can be connected to an auxiliary assembly to be driven; and a switching element, which is operatively arranged between the input shaft and the input element of the transmission chain, to selectively connect the input shaft to the output element. The output element is arranged on an output shaft, which is mounted in a bearing cap.

15 Claims, 3 Drawing Sheets

(51) Int. Cl.
*F16C 19/36* (2006.01)
*F16H 57/02* (2012.01)

(52) U.S. Cl.
CPC .............. *F16H 2057/02026* (2013.01); *F16H 2057/02043* (2013.01)

(56) References Cited

U.S. PATENT DOCUMENTS

| | | | |
|---|---|---|---|
| 4,191,072 A | 3/1980 | Ehrlinger et al. | |
| 4,597,301 A | 7/1986 | Weis et al. | |
| 4,610,175 A * | 9/1986 | Weis | B60K 17/28 74/606 R |
| 5,267,477 A * | 12/1993 | Irikura | B60K 17/28 74/15.6 |
| 5,535,864 A * | 7/1996 | Ishii | B60K 17/28 192/3.56 |
| 5,645,363 A * | 7/1997 | Dafforn | B60K 17/28 403/3 |
| 5,913,547 A * | 6/1999 | Fernandez | F16H 57/02 411/389 |
| 7,163,077 B2 | 1/2007 | Hasegawa | B60K 17/105 180/305 |
| 7,765,884 B2 | 8/2010 | Frait et al. | |
| 8,033,298 B2 * | 10/2011 | Matsufuji | F16H 61/0009 137/899 |
| 8,393,236 B1 * | 3/2013 | Hauser | B60T 1/062 74/15.86 |
| 8,739,905 B1 * | 6/2014 | Bennett | F16H 57/028 475/23 |
| 9,221,336 B1 * | 12/2015 | Bonny | B60K 25/02 |
| 9,290,092 B2 | 3/2016 | Kempf et al. | |
| 9,457,659 B2 | 10/2016 | Kempf et al. | |
| 10,948,028 B2 * | 3/2021 | Pritchard | F16D 13/648 |
| 11,479,116 B2 * | 10/2022 | Epple | B60K 25/06 |
| 11,479,117 B2 * | 10/2022 | Epple | B60K 25/06 |
| 11,607,951 B2 * | 3/2023 | Epple | B60K 17/28 |
| 2011/0162466 A1 * | 7/2011 | Hillyer | B60K 17/28 74/11 |
| 2018/0339586 A1 | 11/2018 | Trübenbach | |
| 2019/0193560 A1 | 6/2019 | Trübenbach et al. | |

FOREIGN PATENT DOCUMENTS

| | | |
|---|---|---|
| DE | 10 2005 055 795 A1 | 5/2007 |
| DE | 10 2007 059 366 A1 | 2/2009 |
| DE | 10 2008 033 434 A1 | 4/2009 |
| DE | 10 2014 107 841 A1 | 12/2014 |
| DE | 10 2015 121 019 A1 | 6/2016 |
| DE | 10 2015 223 604 A1 | 6/2017 |
| DE | 10 2016 212 209 A1 | 1/2018 |
| EP | 0 677 416 A1 | 4/1995 |
| GB | 2 153 763 A1 | 8/1985 |
| JP | 58128926 A * | 8/1983 |
| JP | 59014521 A * | 1/1984 |
| WO | 03/035426 A1 | 3/2003 |

OTHER PUBLICATIONS

German Search Report Corresponding to 10 2018 204 910.6 dated Feb. 1, 2019.
German Search Report Corresponding to 10 2018 204 909.2 dated Feb. 1, 2019.
International Search Report Corresponding to PCT/EP2019/054780 dated Apr. 12, 2019.
International Search Report Corresponding to PCT/EP2019/054777 dated Apr. 12, 2019.
International Search Report Corresponding to PCT/EP2019/054781 dated Apr. 12, 2019.
Written Opinion Corresponding to PCT/EP2019/054780 dated Apr. 12, 2019.
Written Opinion Corresponding to PCT/EP2019/054777 dated Apr. 12, 2019.
Written Opinion Corresponding to PCT/EP2019/054781 dated Apr. 12, 2019.

* cited by examiner

AUXILIARY POWER TAKE-OFF ASSEMBLY

This is a National Stage completion of PCT/EP2019/054777 filed Feb. 27, 2019, which claims priority from German patent application serial no. 10 2018 204 910.6 filed Mar. 29, 2018.

FIELD OF THE INVENTION

The present invention relates to an auxiliary power take-off assembly and a transmission having an auxiliary power take-off assembly, and to a bearing cap for mounting a drive output shaft of the auxiliary power take-off assembly.

BACKGROUND OF THE INVENTION

Vehicle transmissions in utility vehicles often comprise an auxiliary power take-off assembly by means of which various types of auxiliary aggregates in the vehicle can be driven. This applies in equal measure to transmissions with a friction disk clutch and a vehicle transmission equipped with a torque converter.

Auxiliary power take-off assemblies are used in particular in buses, trucks, construction machinery, agricultural vehicles or special vehicles.

Auxiliary power take-off assemblies are available in drive-dependent, clutch-dependent or motor-dependent versions. Drive-dependent auxiliary power take-off assemblies, for example, supply the hydraulic system of dual-circuit steering systems with a working pressure, whereby rolling vehicles can still be steered if the primary system has failed due to a motor breakdown. Clutch-dependent auxiliary power take-offs are suitable for short- or long-term operation during driving or at rest. Motor-dependent auxiliary power take-offs differ from clutch-dependent auxiliary power take-offs in that in motor-dependent auxiliary power take-offs there is a direct connection to the crankshaft of the drive motor, which bypasses the vehicle clutch or torque converter, so that such auxiliary power take-offs are mechanically permanently connected with the crankshaft of the drive motor. They are designed for high constant power in long-term operation and can be loaded with the maximum motor torque. They can be operated while the vehicle is driving or at rest, and can be engaged or disengaged under load. Motor-dependent auxiliary power take-offs are arranged between the motor and the transmission, they are driven always directly by the motor by way of a separate clutch, and can also be engaged and disengaged under load while the vehicle is driving or at rest.

From DE 10 2016 21 22 09 A1 an auxiliary power take-off assembly for a motor vehicle transmission with a torque converter is known, which has a driveshaft permanently connected to a drive motor of the motor vehicle by way of the pump shaft of the torque converter. Furthermore, the auxiliary power take-off assembly comprises a transmission chain with a drive input element, an intermediate gear and a drive output element, whose drive output element is connected to an auxiliary aggregate that is to be driven, and a shifting element. The shifting element is arranged for the optional connection of the driveshaft to a drive input element, and acts between the driveshaft and the drive input element of the transmission chain. In that way the auxiliary power take-off assembly can already be decoupled, behind the driveshaft connected to the pump shaft of the torque converter, completely from the rest of the transmission chain and the auxiliary aggregate, so that when not needed these elements do not have to co-rotate and do not therefore produce any losses and noise.

SUMMARY OF THE INVENTION

The purpose of the present invention is to simplify the structure known from the prior art and to minimize the installation effort.

This objective is achieved by an auxiliary power take-off assembly, a transmission and a bearing cap having the characteristics specified in the independent claims. Design features are the subject of the subordinate claims.

The auxiliary power take-off assembly, in a transmission of a motor vehicle, having a torque converter, with a transmission input and a transmission output, with a driveshaft permanently connected to a drive motor of the motor vehicle via the pump shaft of the torque converter at the transmission input, a transmission output shaft at the transmission output and a transmission chain consisting at least of a drive input element and a drive output element, whose drive output element can be connected to an auxiliary aggregate which is to be driven, has a shifting element arranged to act between the driveshaft and the drive input element of the transmission chain for the optional connection of the driveshaft to the drive output element, and is characterized in that the drive output element is arranged on a drive output shaft which is mounted in a bearing cap. The drive input element and the drive output element are preferably in the form of gearwheels, and the drive input gear and the drive output gear are preferably fitted in the transmission chain without an additional intermediate gear, so that the teeth of the drive input gear and the drive output gear engage directly in one another. The transmission chain consists only of the drive input element and the drive output element, or drive input wheel and drive output wheel.

The shifting elements, bearings, shafts and wheels, as well as the actuator system, control system and actuators are completely integrated in the transmission housing. In the fitted condition the bearing cap forms part of the transmission housing and for that it is connected thereto. Thus, the automatic transmission is a transmission with an interface for the fitting of end consumers, which means that no longer is an additional auxiliary power take-off required, but rather, the transmission provides the necessary interfaces for the end consumers.

The transmission input is on the driven side of the transmission, where the drive motor introduces a torque into the transmission via an input shaft. The transmission output is on the output side, i.e. on that side of the transmission where a transmission output shaft transmits torque to a drive output shaft or a differential by way of which the wheels of the vehicle are driven.

The drive output shaft is connected by way of an intermediate shaft to the auxiliary aggregate, so that the auxiliary aggregate can be arranged on the transmission output side. The intermediate shaft is fitted in the drive output shaft.

The bearing cap closes an opening in the transmission housing, and the bearing cap has bores in which the drive output shaft is mounted. Preferably, the bearing cap has two bores. Each bore of the bearing cap is formed in a molding or projection of the bearing cap, and each has a bearing, such as a conical roller bearing, for receiving and mounting the drive output shaft. The drive output shaft is preferably mounted so as to extend with its axis parallel to the transmission output shaft.

As described, the drive input element, the drive output element, the shifting element and the drive output shaft are arranged inside the transmission housing and the auxiliary power take-off assembly is therefore part of the transmission, so that no additional PTO is needed for driving auxiliary aggregates. For this purpose, the auxiliary power take-off assembly with the features indicated earlier is fitted in a transmission, which can be made available as a complete component.

The intermediate shaft is at least partially surrounded by a protective tube. The protective tube is fitted in the transmission on the transmission input side and the transmission output side.

The bearing cap has bores for receiving the drive output shaft. Preferably, the bearing cap has two bores. In addition the bearing cap must be able to be connected to the transmission housing and fixed. This preferably happens by means of fixing bores through which the bearing cap and the transmission housing can be bolted to one another. The bearing cap also has a molding which is made hollow in the direction of the inside of the transmission. In this hollow molding is the drive output element, in the form of a drive output wheel that is mounted and free to rotate on the drive output shaft.

The bores for receiving the drive output shaft are arrange in moldings of the bearing cap, which project oppositely to the hollow molding for the drive output wheel in the direction of the inside space of the transmission and are preferably formed as two moldings opposite one another. The bores for receiving the drive output shaft are made at a right-angle to the fixing bores. To receive the drive output shaft, the bores for receiving the drive output shaft comprise, for example, a conical roller bearing for mounting the drive output shaft. Preferably, the drive output shaft is mounted in the bores in such manner that it extends with its axis parallel to the transmission output shaft. That means that in this case the bores are also arranged with their axes parallel to the output shaft of the transmission.

BRIEF DESCRIPTION OF THE DRAWINGS

The invention will now be explained in greater detail with reference to figures, which show.

DETAILED DESCRIPTION OF THE PREFERRED EMBODIMENTS

Figure 1:
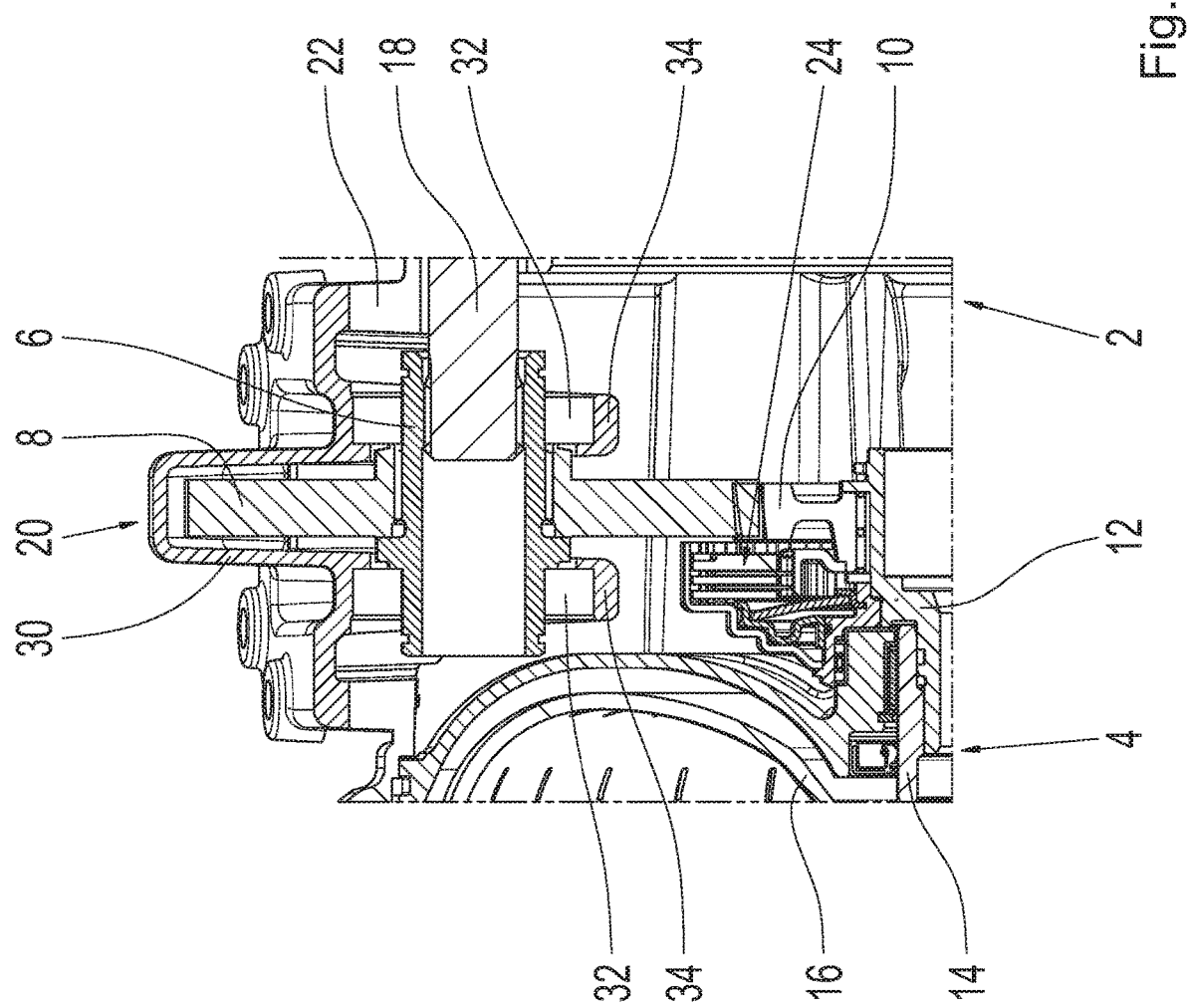
FIG. 1: A cross sectional view of a transmission with an auxiliary power take-off assembly according to the invention

FIG. 1 shows a section of an automatic transmission 2 according to the invention with an auxiliary power take-off assembly 20, wherein a torque converter 4 is fitted in such manner that the pump wheel 16 is driven by a drive motor and is connected permanently to the pump shaft 14. Connected to the pump shaft 14 is the driveshaft 12 of the auxiliary power take-off assembly 20. On the driveshaft 12 of the auxiliary power take-off assembly 20 the drive input element 10 of the auxiliary power take-off assembly 20 is mounted to rotate freely. The drive input element 10 can be coupled to or decoupled from the driveshaft by means of a shifting element 24. In the decoupled condition, the components of the auxiliary power take-off assembly 20 and of any auxiliary aggregate connected thereto, if present, are no longer driven. This reduces noise and power losses during driving operation. In the coupled condition, the drive input element 10 transmits torque directly to a drive output element 8, which is mounted on a drive output shaft 6. The drive output shaft 6 is mounted in the bearing cap 30, which has two moldings 34 or projections in which bores 32 for fitting the drive output shaft 6 are provided. In these bores 32 various types of bearings can be provided, for example conical roller bearings, which hold the drive output shaft 6. The bearing cap 30 closes an opening in the transmission housing 22, for which purpose it can be bolted to the transmission housing 22. In the opposite direction to the moldings 34, a hollow molding or projection 38 is provided, which surrounds the drive output element 8.

Figure 2:
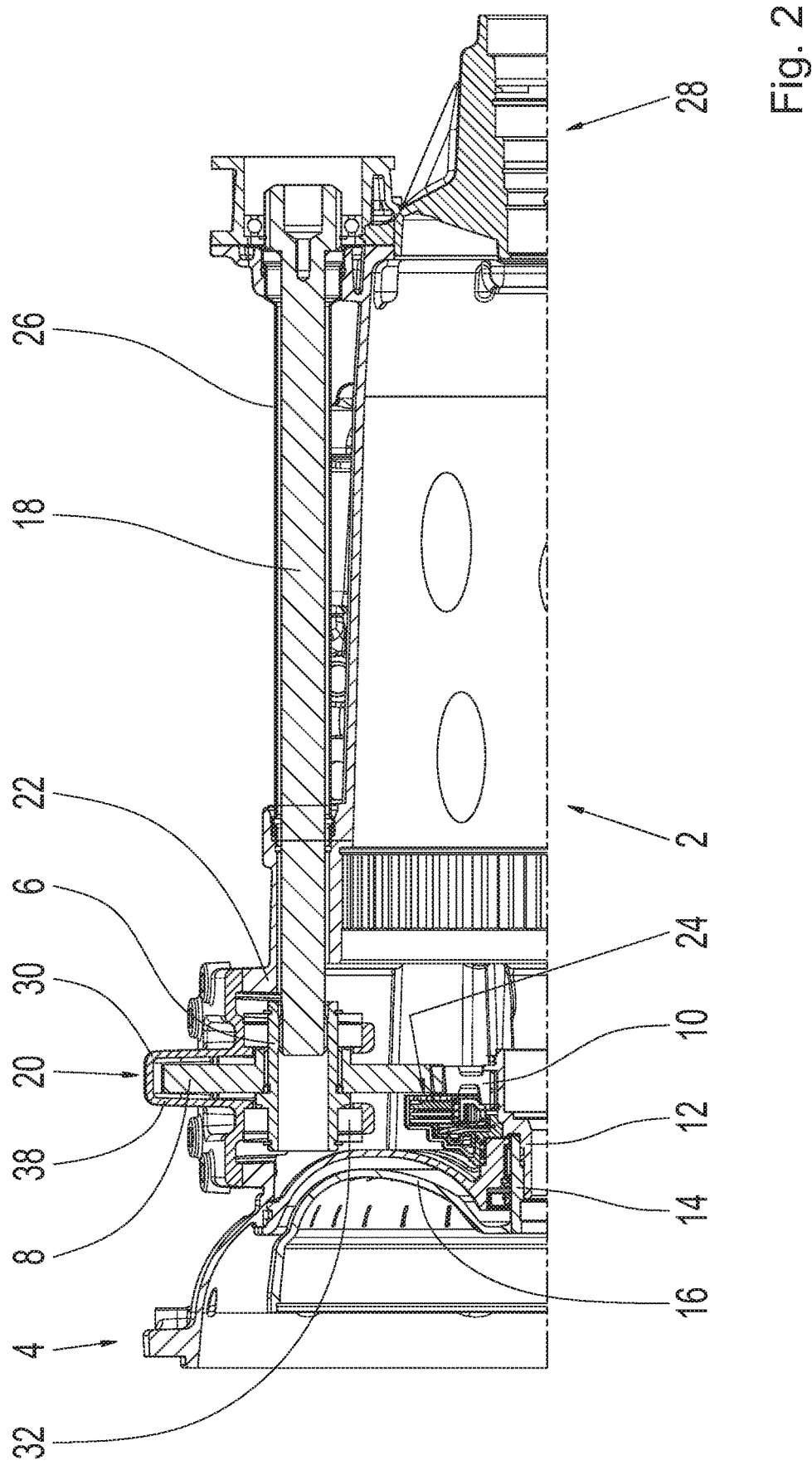
FIG. 2: An auxiliary power take-off assembly, including the intermediate shaft

FIG. 2 shows an extended section of a transmission 2 according to the invention. The pump wheel 16 is connected to the pump shaft 14, which in turn is connected to the driveshaft 12. On the driveshaft 12 is mounted the drive input wheel 10, which can be coupled to or decoupled from the driveshaft 12 by means of a shifting element 24. A drive output gear 8 is directly engaged with the drive input gear 10 and is mounted on the drive output shaft 6. As already described, the drive output shaft 6 is mounted in the bearing cap 30.

In the drive output shaft 6 is fitted an intermediate shaft 18, which passes torque from the drive output shaft to the transmission output 28 where an appropriate auxiliary aggregate or end consumer can be connected and in that way driven. By virtue of the guiding to the transmission output 28, as in the case of classical external auxiliary power take-offs, the auxiliary aggregates can be connected to the transmission output 28. In this case the intermediate shaft 18 is surrounded by a protective tube 26 and is mounted on the transmission input side or on the side of the drive output shaft 6 in the drive output shaft 6. To drive an auxiliary aggregate, the intermediate shaft 18 can have a driving profile on the transmission output side. The driving profile can receive a driveshaft or a driving flange of an auxiliary aggregate, and drive the latter. This can be, for example, a driveshaft of a hydraulic pump or a drive output flange. The driving profile of the intermediate shaft can also be designed to receive a driveshaft of a step-up stage. The protective tube 26 of the intermediate shaft 18 is filled in the transmission 2 on the transmission input side or the transmission output side 28.

The auxiliary power take-off assembly 20 is part of the transmission 2, since the drive input wheel 10, the drive output gear 8, the shifting element 24 and the drive output shaft 6 are arranged inside the transmission housing 22, so that no additional PTO is needed for driving auxiliary aggregates.

Figure 3:
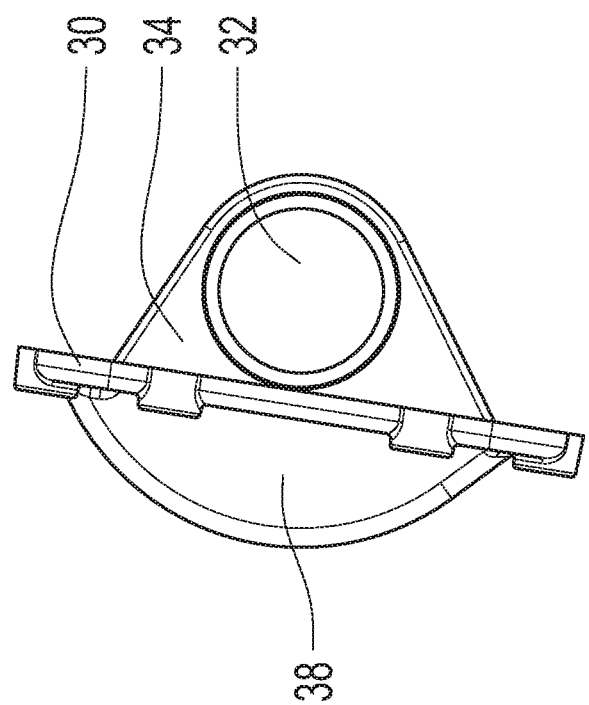
FIGS. 3, 3A: Two views of the bearing cap
Figure 3A:
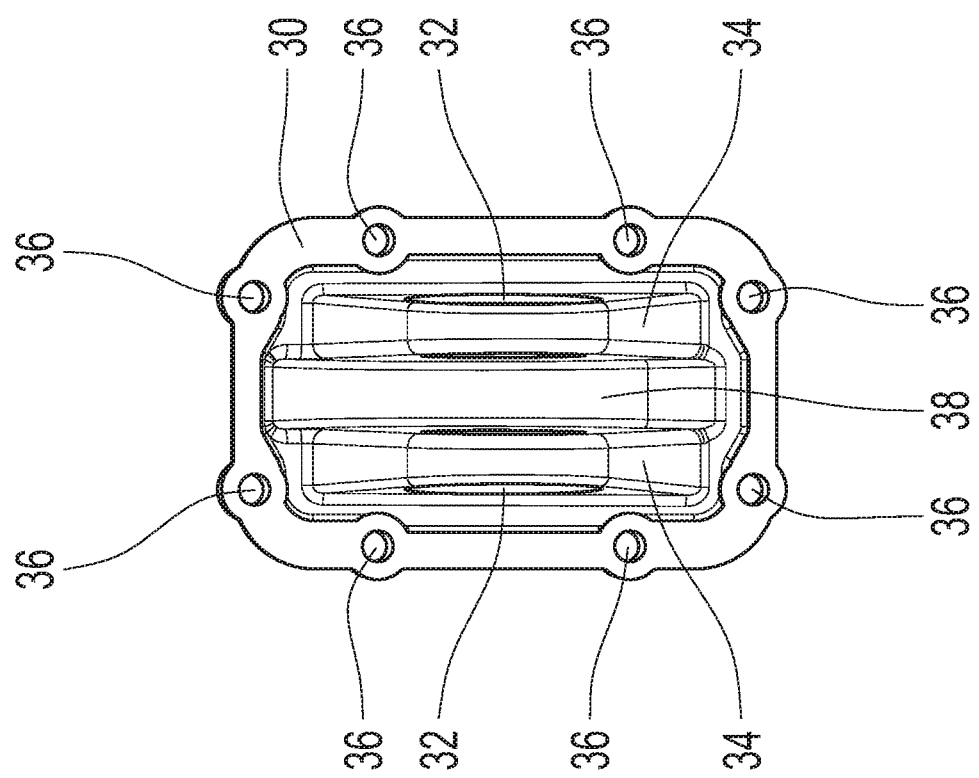

FIGS. 3 and 3A show the bearing cap 30. This is a one-piece component with fixing bores 36 for fixing it to the transmission housing 22 and thereby closing an opening in the transmission housing 22. The fixing bores 36 can be provided in various numbers and arrangements. The bearing cap 30 also has two moldings 34 extending in the direction toward the inside of the transmission, each of which moldings has a bore 32. The bores 32 serve as bearing bores in which the drive output shaft 6 is fitted. In addition various types of bearing can be provided in the bores 32, for example conical roller bearings. Opposite to the moldings 34 a hollow molding 38 is provided, which surrounds the drive output wheel 8.

INDEXES

2 Transmission
4 Torque converter
6 Drive output shaft

8 Drive output gear
10 Drive input gear
12 Driveshaft
14 Pump shaft
16 Pump wheel
18 Intermediate shaft
20 Auxiliary power take-off assembly
22 Transmission housing
24 Shifting element
26 Protective tube
28 Transmission output
30 Bearing cap
32 Bore
34 Molding
36 Fixing bores
38 Hollow molding

The invention claimed is:

1. An auxiliary power take-off assembly in a transmission of a motor vehicle having a torque converter, with a transmission input and a transmission output, the auxiliary power take-off assembly comprising:
a driveshaft being permanently connected to a drive motor of the motor vehicle by way of a pump shaft of the torque converter at the transmission input,
a transmission output shaft at the transmission output and a transmission chain having at least a drive input element and a drive output element,
the drive output element being connectable to an auxiliary aggregate to be driven,
a shifting element being arranged and acting between the driveshaft and the drive input element of the transmission chain for optional connection of the driveshaft to the drive output element, and
the drive output element being arranged on a drive output shaft which is mounted in a bearing cap, the bearing cap having moldings with bores therein, the bearing cap being fixable to a transmission housing such that the moldings extend into an interior of the transmission housing and the bores are located within the interior of the transmission housing.

2. The auxiliary power take-off assembly according to claim 1, wherein the drive output shaft is connected to the auxiliary aggregate by way of an intermediate shaft so that the auxiliary aggregate is arrangeable on a transmission output side.

3. The auxiliary power take-off assembly according to claim 2, wherein the intermediate shaft is mounted in the drive output shaft.

4. The auxiliary power take-off assembly according to claim 1, wherein the bearing cap covers an opening in the transmission housing, and the drive output shaft is fitted in the bores of the moldings.

5. The auxiliary power take-off assembly according to claim 4, wherein each of the bores in the bearing cap comprises a bearing for holding and bearing the drive output shaft.

6. The auxiliary power take-off assembly according to claim 1, wherein the drive input element, the drive output element, the shifting element and the drive output shaft are arranged inside the transmission housing and the auxiliary power take-off assembly is, therefore, part of the transmission so that an additional power take-off is not required for driving the auxiliary aggregate.

7. The auxiliary power take-off assembly according to claim 1, wherein the drive output shaft defines an axis and is mounted in such manner that the axis extends parallel to the transmission output shaft.

8. A transmission with an auxiliary power take-off assembly according to claim 1.

9. A bearing cap for mounting a drive output shaft of an auxiliary power take-off assembly according to claim 1, wherein the bores in the moldings of the bearing cap receive the drive output shaft.

10. The bearing cap according to claim 9, wherein the bearing cap has fixing bores for connecting the bearing cap to the transmission housing.

11. The bearing cap according to claim 10, wherein the bores for receiving the drive output shaft are formed at a right-angle to the fixing bores.

12. The bearing cap according to claim 9, wherein the bearing cap has a hollow molding extending in a direction opposite the moldings and in which the drive output element, which is mounted on the drive output shaft, is freely rotatable.

13. The bearing cap according to claim 9, wherein the bearing cap has a planar surface which is fixed to the transmission housing, and the bores in the moldings are aligned along an axis that is parallel to the planar surface for receiving of the bearing cap.

14. The bearing cap according to claim 9, wherein the bores for receiving the drive output shaft have bearings for mounting the drive output shaft.

15. An auxiliary power take-off assembly in a motor vehicle transmission having a torque converter, a transmission input and a transmission output, the auxiliary power take-off assembly comprising:
a driveshaft of the power take-off assembly being permanently connected at the transmission input, via a pump shaft of the torque converter, to a drive motor of a motor vehicle, and to a transmission output shaft at the transmission output and to a transmission chain comprising a drive input element, a drive output element and a shifting element,
the drive output element being connectable to an auxiliary aggregate for driving the auxiliary aggregate,
the shifting element being arranged between the driveshaft and the drive input element of the transmission chain, and being engageable to connect the driveshaft to the drive output element,
the drive output element being mounted on a drive output shaft which is rotatably supported on a bearing cap that is fixed to a housing of the motor vehicle transmission, the housing having an opening and an interior, and
the bearing cap having moldings and each of the moldings has a bore, the bearing cap has a perimeter that is fixed to the housing such that the moldings extend from the bearing cap through the opening and into the interior of the housing, the drive output shaft being rotatably supported in the bores within the interior of the housing.

* * * * *